(12) United States Patent
Carnevali

(10) Patent No.: US 7,959,116 B2
(45) Date of Patent: Jun. 14, 2011

(54) CONFIGURABLE MOUNTING BRACKET

(76) Inventor: Jeffrey D. Carnevali, Seattle, WA (US)

( * ) Notice: Subject to any disclaimer, the term of this patent is extended or adjusted under 35 U.S.C. 154(b) by 276 days.

(21) Appl. No.: 10/802,408

(22) Filed: Mar. 17, 2004

(65) Prior Publication Data
US 2005/0205724 A1 Sep. 22, 2005

(51) Int. Cl.
*F16M 13/00* (2006.01)
(52) U.S. Cl. ............... 248/177.1; 248/163.1; 248/188.9
(58) Field of Classification Search .............. 248/163.1, 248/432, 168, 434, 435, 177.1, 178.1, 187.1, 248/176.3, 188.8, 188.9
See application file for complete search history.

(56) References Cited

U.S. PATENT DOCUMENTS

| | | | | |
|---|---|---|---|---|
| 2,684,822 A | * | 7/1954 | Odin ........................... | 248/179.1 |
| 4,629,150 A | * | 12/1986 | O'Callaghan ................. | 248/167 |
| 5,043,750 A | * | 8/1991 | Yamaguchi ................... | 396/428 |
| 5,503,526 A | * | 4/1996 | Neils et al. ....................... | 416/63 |
| 5,845,885 A | | 12/1998 | Carnevali | |
| 5,931,560 A | * | 8/1999 | Hoffman ........................ | 362/124 |
| 5,937,537 A | * | 8/1999 | Miller ............................... | 34/97 |
| 6,032,910 A | * | 3/2000 | Richter ....................... | 248/274.1 |
| 6,173,928 B1 | * | 1/2001 | Coats ............................ | 248/171 |
| 6,540,184 B2 | * | 4/2003 | Thaxton ........................ | 248/160 |
| 6,585,212 B2 | | 7/2003 | Carnevali | |
| 6,631,877 B1 | * | 10/2003 | Crain et al. ................... | 248/168 |
| 6,685,385 B1 | * | 2/2004 | Ledingham ................... | 403/400 |

* cited by examiner

*Primary Examiner* — Terrell McKinnon
*Assistant Examiner* — Steven M Marsh
(74) *Attorney, Agent, or Firm* — Charles J. Rupnick

(57) ABSTRACT

A multiply configurable tripodal mounting bracket having multiple permanently bendable solid metal support rods, means for clamping a first end of each support rod in a fixed tripodal arrangement, and means for securing a second end of each support rod relative to an external surface, such as a vehicle floorboard. The mounting bracket also includes means for fixing an external device, such as a portable desk or laptop computer, to the clamp portion of the bracket.

19 Claims, 4 Drawing Sheets

CONFIGURABLE MOUNTING BRACKET

This application is related to co-pending patent application Ser. No. 10/698,158 entitled, "FLEXIBLE SUPPORT ARM," filed on Oct. 31, 2003, in the name of the inventor of the present invention and which is incorporated herein by reference.

FIELD OF THE INVENTION

The present invention relates to a configurable mounting bracket, and in particular to a vehicle-mountable multiply configurable tripod for mounting a portable desktop, a computer or the like.

BACKGROUND OF THE INVENTION

In today's business world many people need to carry a laptop computer to conduct business on the road or even while vacationing. In general, our automobiles and other vehicles were designed for carrying passengers, rather than laptop computers or portable desks. As a result, the laptop or desk is dropped into the passenger seat where it is prey to sudden starts and stops and is accessed only with difficulty by the driver leaning over the passenger seat. Such access is impossible while driving without courting an accident. Mounting brackets suitable for supporting a portable desk or laptop computer are generally well-known for permanent installation in an automobile or other vehicle. Some of these known vehicle-mountable brackets are configurable to fit different makes and models of vehicle. All but a few require cutting of the vehicle to fit the mounting bracket, trimming or cutting the bracket to fit, or at least drilling the vehicle to accept fasteners for securing the bracket. Furthermore, these known vehicle-mountable brackets are typically limited to presenting their mounting surfaces, and by extension the laptop computers or portable desks, in a predetermined single position relative to the vehicle driver or other user.

SUMMARY OF THE INVENTION

The present invention is a vehicle-mountable multiply configurable tripodal mounting bracket that overcomes limitations of the prior art for securely mounting a portable desktop, a computer or the like. Accordingly, the mounting bracket of the invention includes multiple permanently bendable cylindrical solid metal support rods each having a first lengthwise end portion fitted into a clamp having a combination rigid mounting platform, and a second lengthwise end portion opposite from the respective first lengthwise end portion, each of the respective second rod lengthwise end portions being fitted with a shoe that is structured with means for securing the respective second end portion relative to an external surface using a structure configured either for being permanently fixed to the external surface with a mechanical fastener, or configured for resisting slipping relative to the external surface.

The clamp portion being formed of the combination clamp and rigid mounting platform is an outer female collar forming therein a truncated funnel-shaped cavity having formed at uniformly spaced intervals around a conical inside wall surface thereof multiple part cylindrical relief grooves that are sized for nesting of the first lengthwise end portion of one of the cylindrical metal rods, one of the part cylindrical relief grooves being formed for each of the cylindrical metal rods which, according to another aspect of the invention, may number three. A truncated cone-shaped inner male wedge has at uniformly spaced intervals around a conical outside wall surface thereof multiple part cylindrical relief grooves that are sized for nesting of the lengthwise end portion of one of the cylindrical metal rods, one of the wedge's part cylindrical relief grooves being formed for each of the permanently bendable metal rods with the relief grooves being spaced around the outside conical wall surface in a complementary configuration with respective ones of the relief grooves formed on the collar inside wall surface for forming multiple pairs of complementary part cylindrical relief grooves, with one of the pairs being provided for each of the cylindrical metal support rods. The wedge is sized relative to the collar such that a cylindrical inside diameter formed by each of the pairs of complementary part cylindrical relief grooves is smaller than an outer diameter of the respective cylindrical metal support rod end portions when nested therein, whereby the outer diameters of the respective cylindrical metal support rod end portions are securely clamped between the respective pairs of complementary part cylindrical relief grooves. The clamp portion also includes means for urging the male wedge deep into the cup-shaped female collar with each of the rod lengthwise end portions securely captured between one of the pairs of complementary part cylindrical relief grooves.

According to another aspect of the invention, the rigid mounting platform portion of the combination clamp and rigid mounting platform is formed of an outer base surface of the outer female collar opposite from an inner floor portion of the truncated funnel-shaped cavity thereof. The rigid mounting platform portion is structured with means for permanently attaching an external device thereto, either directly or through an intermediary mounting device.

According to another aspect of the invention, the mounting bracket of the present invention includes an elastically flexible plastic tubular sheath covering each of the permanently bendable cylindrical metal support rods and optionally secured at opposite ends to the clamp and shoe at the ends of the metal support rods.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

Figure 1:
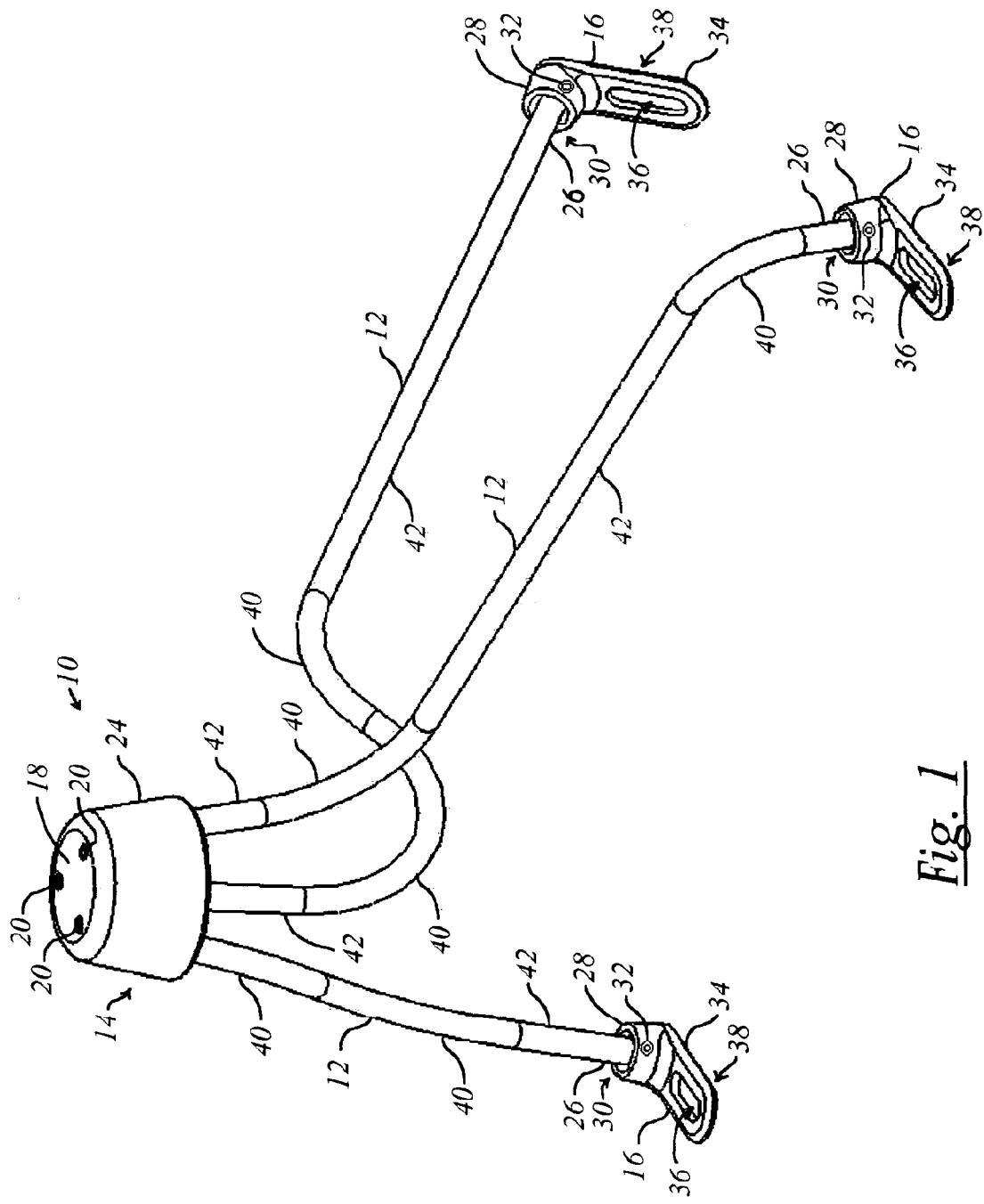
FIG. 1 illustrates the invention embodied as a mounting bracket apparatus having a trio of permanently bendable cylindrical solid metal support rods extended between a combination clamp and rigid mounting platform and a shoe that is structured with means for securing the mounting bracket relative to an external surface, such as a floor of an automobile or other vehicle.

In the Figures, like numerals indicate like elements.

The present invention is a vehicle mounting bracket embodied, by example and without limitation, as a rigidly positionable vehicle-mountable multiply configurable tripodal mounting bracket for securely and fixedly mounting a portable desktop, a computer or the like, the mounting bracket having a plurality of permanently bendable cylindrical solid metal support rods each having a first lengthwise end portion fitted into a combination clamp and rigid mounting platform and a second lengthwise end portion opposite from the respective first lengthwise end portion, each of the respective second rod lengthwise end portions being fitted with a shoe that is structured with means for securing the respective second end portion relative to an external surface using a structure configured either for being permanently fixed to the external surface with a mechanical fastener, or configured for resisting slipping relative to the external surface.

The clamp portion being formed of the combination clamp and rigid mounting platform being, by example and without limitation, an outer female collar forming therein a truncated funnel-shaped cavity having formed at uniformly spaced intervals around a conical inside wall surface thereof a plurality of part cylindrical relief grooves that are sized for nesting of the first lengthwise end portion of one of the cylindrical metal rods, one of the plurality of part cylindrical relief grooves being formed for each of the plurality of cylindrical metal rods which may number three; a truncated cone-shaped inner male wedge having at uniformly spaced intervals around a conical outside wall surface thereof a plurality of part cylindrical relief grooves that are sized for nesting of the lengthwise end portion of one of the cylindrical metal rods, one of the wedge's plurality of part cylindrical relief grooves being formed for each of the plurality of permanently bendable metal rods with the relief grooves being spaced around the outside conical wall surface in a complementary configuration with respective ones of the relief grooves formed on the collar inside wall surface for forming a plurality of pairs of complementary part cylindrical relief grooves with one of the pairs being provided for each of the cylindrical metal support rods, the wedge being sized relative to the collar such that a cylindrical inside diameter formed by each of the plurality of pairs of complementary part cylindrical relief grooves is smaller than an outer diameter of the respective cylindrical metal support rod end portions when nested therein, whereby the outer diameters of the respective cylindrical metal support rod end portions are securely clamped between the respective pairs of complementary part cylindrical relief grooves; and means for urging the male wedge deep into the cup-shaped female collar with each of the rod lengthwise end portions securely captured between one of the pairs of complementary part cylindrical relief grooves.

The rigid mounting platform portion of the combination clamp and rigid mounting platform being, by example and without limitation, formed of an outer base surface of the outer female collar opposite from an inner floor portion of the truncated funnel-shaped cavity thereof, the rigid mounting platform portion being structured with means for permanently attaching an external device thereto, either directly or through an intermediary mounting device.

According to one embodiment of the invention, the mounting bracket of the present invention includes an elastically flexible plastic tubular sheath covering each of the permanently bendable cylindrical metal support rods and optionally secured at opposite ends to the clamp and shoe at the ends of the metal support rods.

FIG. 1 illustrates the invention embodied as a mounting bracket apparatus 10 formed at its core by a trio of permanently bendable elongated cylindrical solid metal support rods 12 that each extend between a combination clamp mechanism and rigid mounting platform 14 and a shoe mechanism 16 that is structured with means for securing the mounting bracket 10 relative to an external surface, such as a floor of an automobile or other vehicle. The support rods 12 are legs either all of a single length, or of two different lengths, or of all different lengths, as appropriate to a particular application. It is intended that the lengths be set during manufacturing by shortening from a standard length. However, the lengths may all be identical at the time of shipment from the factory and later modified as appropriate by an installer or end user. The illustrations showing the support rods 12 of different lengths is not intended to operate as an absolute limitation on the scope of the invention. The support rods 12 are sized to substantially rigidly support the weight of a portable desk or laptop computer on a platform, for example, of the type described by Carnevali, the inventor of the present invention, in U.S. Pat. No. 6,585,212, issued Jul. 1, 2003, entitled "QUICK RELEASE ELECTRONICS PLATFLORM," which is incorporated herein by reference. By example and without limitation, the support rods 12 are embodied as cylindrical rods of a permanently bendable aluminum or aluminum alloy with a substantially constant diameter of about ½ inch, but at least in the range of about ¼ inch or ⅜ inch to about 1 inch. The permanently bendable cylindrical support rods 12 are alternatively realized in steel, copper, permanently bendable copper alloys or another permanently bendable metal or rigid plastic material without limiting the practice of the invention.

As discussed in detail herein, all of the support rods 12 are securely fixed to the combination clamp and rigid mounting platform 14 which includes a rigid mounting platform portion 18 embodied as a substantially planar surface sized to support a portable desk or laptop computer on a platform. Furthermore, the mounting platform portion 18, or another part of the combination clamp and mounting platform 14, is structured with means for permanently attaching an external device thereto, such as a portable desk or laptop computer on a platform, either directly or through an intermediary mounting device, for example, of the type described by Carnevali, the inventor of the present invention, in U.S. Pat. No. 5,845,885, issued Dec. 8, 1998, entitled "UNIVERSALLY POSITIONABLE MOUNTING DEVICE," which is incorporated herein by reference. By example and without limitation, the means for permanently attaching an external device to the mounting platform portion 18 is embodied in one or more threaded fasteners 20 passed through suitable clearance through-holes 22 distributed on around the mounting platform portion 18, as discussed in detail herein.

The mounting platform portion 18, as illustrated in the Figures, is embodied at one end of a clamp portion 24 of the combination clamp and rigid mounting platform 14, which is discussed in detail herein.

Each of the support rods 12 has a short lengthwise end portion 26 opposite from the combination clamp and mounting platform 14, each of which is fitted with one of the shoes 16 that are structured with means for securing the respective rod end portion 26 relative to an external surface. Each of the shoes 16 includes means for gripping the rod end portion 26. By example and without limitation, each of the shoes 16 is provided with an ankle portion 28 having an aperture 30 sized to admit the rod end portion 26 and means to grip it, such as a set screw 32 applied to a threaded aperture (also indicated at 32). Alternatively, the shoe 16 is welded, soldered or brazed to the rod end portion 26. By example and without limitation, as illustrated in FIG. 1, one or more of the shoes 16 is formed of a substantially rigid material, e.g., metal or hard plastic, and is structured with a foot portion 34 that is structured for being permanently fixed to the external surface with a mechanical fastener. For example, the foot portion 34 of each shoe 16 is structured with an aperture or slot 36 formed therethrough through which a mechanical fastener, such as a screw or bolt, can pass for securing the shoe 16 to the external surface, such a floor board of an automobile or other vehicle. Each of the support rods 12 is bendable by hand to orient a sole 38 of the foot 34 into substantially parallel alignment with the external surface for more securely fixing the shoe 16 thereto. By example and without limitation, the bendable support rods 12 are illustrated as having different bent and substantially straight portions 40, 42, respectively.

Figure 2:
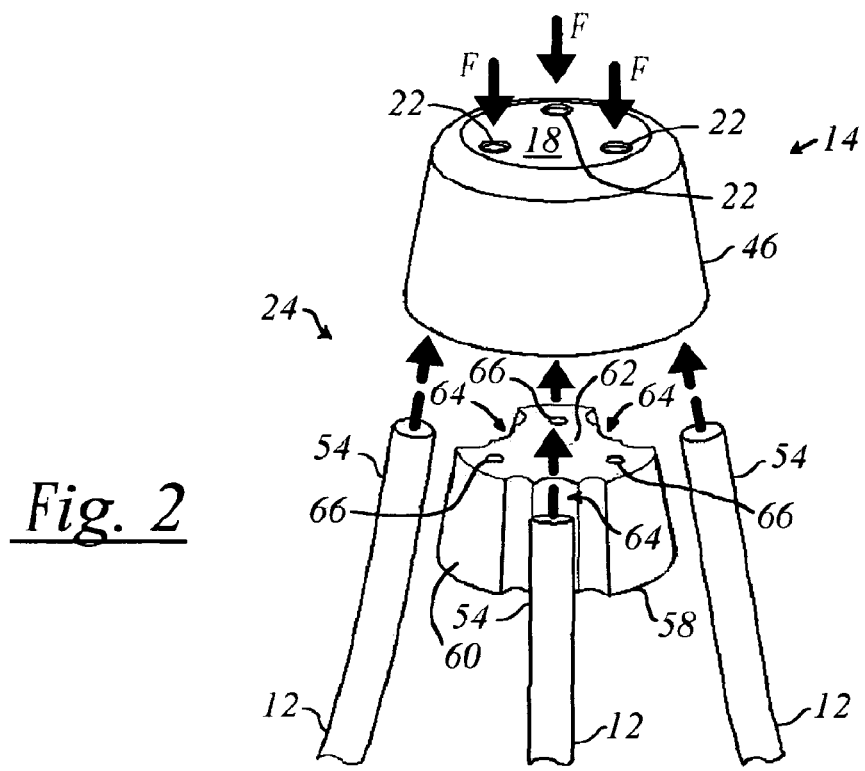
FIGS. 2 and 3 are respective top and bottom perspective exploded views of the combination clamp and rigid mounting platform.
Figure 3:
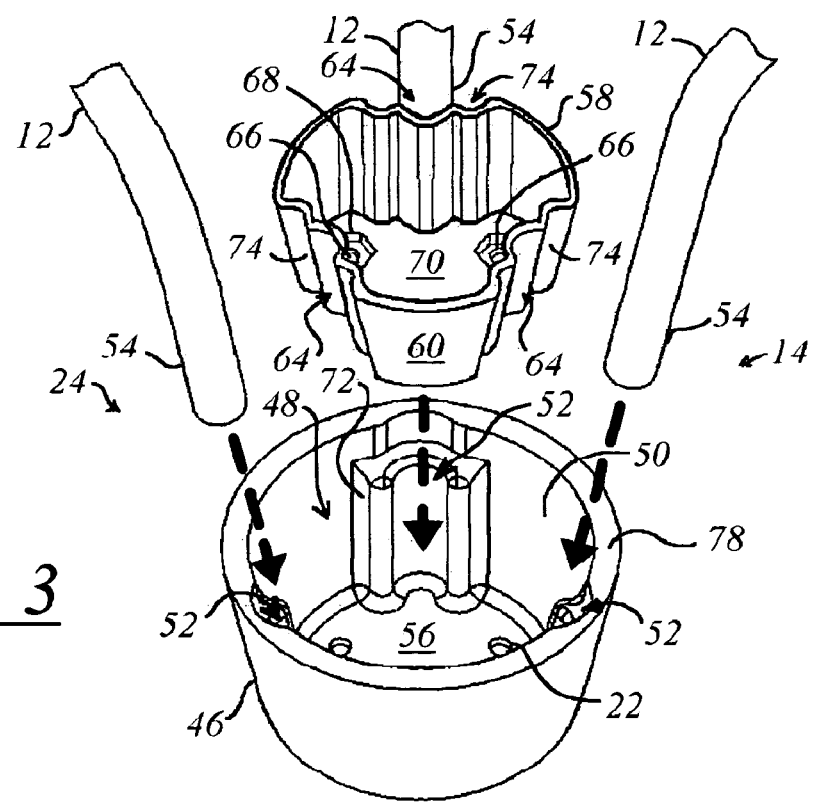

FIGS. 2 and 3 are exploded views of the combination clamp and rigid mounting platform 14 from different views, each showing assembly of the clamp portion 24 with the plurality of bendable support rods 12. Accordingly, FIG. 2 illustrates by example and without limitation one embodiment the combination clamp and rigid mounting platform 14 showing the one or more through-holes 22 distributed on around the mounting platform portion 18.

The mounting platform portion 18 is embodied at one end of the clamp portion 24 which is illustrated in FIG. 3, by example and without limitation, as being formed of an outer cup-shaped female collar 46 embodying a truncated funnel-shaped interior cavity 48 having a substantially conical inside wall surface 50. The collar interior cavity 48 is formed with a plurality of part cylindrical relief grooves 52 at intervals uniformly spaced around the conical inside wall surface 50, one of the relief grooves being provided for each of the plurality of support rods 12 which may number three according to one embodiment of the invention. The relief grooves 52 serve to secure the support rods 12 in fixed alignment with the collar 46, whereby the mounting bracket 10 is stabilized relative to an external surface to which it is secured. The relief grooves 52 are canted inwardly toward one another generally following the conical inside wall surface 50 of the interior cavity 48 in which they are formed. The plurality of part cylindrical relief grooves 52 are formed having substantially the same diameter as the cylindrical metal support rods 12 and are therefore sized for nesting of a short lengthwise end portion 54 of one of the cylindrical metal rods 12. The funnel-shaped interior cavity 48 of the collar 46 is truncated by an inner floor 56 having formed therethrough the plurality of fastener clearance through-holes 22 that are distributed on around the mounting platform portion 18. The inner floor 56 of the collar 46 operates as a stop for the support rods 12 for fixing the support rods 12 lengthwise relative to the collar 46.

The clamp portion 24 of the combination clamp and rigid mounting platform 14 also includes a means for securing the plurality of support rods 12 relative to the part cylindrical relief grooves 52 of the collar 46. By example and without limitation, the means for securing the plurality of support rods 12 relative to the collar's part cylindrical relief grooves 52 is embodied in a inner male wedge 58 having a hollow truncated cone-shape that is structured to fit inside the truncated funnel-shaped interior cavity 48 of the collar 46. Accordingly, a conical outside wall surface 60 of the wedge 58 is sized and shaped to nest substantially concentrically with the collar's funnel-shaped interior cavity 48 with the wedge's conical outside wall surface 60 stopping against the collar's conical inside wall surface 50. Alternatively, the wedge 58 is sized to nest within the collar 46 with its truncated end surface 62 stopping against the collar truncated inner floor 56.

According to one embodiment of the invention, the outside wall surface 60 of the wedge 58 is formed with a plurality of part cylindrical relief grooves 64 that are uniformly spaced at intervals that correspond to the plurality of part cylindrical relief grooves 52 around the collar inside wall surface 50. Each of the plurality of part cylindrical relief grooves 64 is sized for nesting of the short lengthwise end portion 54 of one of the cylindrical metal rods 12. One of the plurality of part cylindrical relief grooves 64 is formed for each of the plurality of permanently bendable metal support rods 12 in a complementary configuration with the relief grooves 52 on the collar inside wall surface 50 for forming a plurality of lengthwise cylindrical cavities between corresponding pairs of complementary part cylindrical relief grooves 52, 64, with one of the pairs being provided for each of the cylindrical metal support rods 12. According to one embodiment of the invention, the pairs of complementary part cylindrical relief grooves 52, 64 remain slightly spaced apart when the support rods 12 are clamped therebetween so that secure clamping of the support rods 12 is thereby assured.

Furthermore, the wedge 58 is sized relative to the collar 46 such that a substantially cylindrical diameter formed by each of the plurality of pairs of complementary part cylindrical relief grooves 52, 64 is smaller than an outer diameter of the respective short lengthwise cylindrical support rod end portions 54 nested therein during assembly. The outer diameters of the respective cylindrical support rod end portions 54 are thereby securely clamped between the respective pairs of complementary part cylindrical relief grooves 52, 64 when the male wedge 58 is securely nested within the female collar 46.

Accordingly, means are provided for urging the male wedge 58 deep into the cup-shaped female collar 46 with each of the rod lengthwise end portions 54 securely captured between one of the plurality of pairs of complementary part cylindrical relief grooves 52, 64. By example and without limitation, the fastener clearance through-holes 22 are optionally aligned with threaded or clearance holes 66 through the truncated end surface 62 of the wedge 58. Threading of fasteners F between the collar 46 and wedge 58 draws the wedge 58 into the collar's funnel-shaped cavity 48, and tightening the fasteners F secures the rod lengthwise end portions 54 between the pairs of complementary part cylindrical relief grooves 52, 64. When the holes 66 are clearance holes for fasteners, a fastener locking relief 68, e.g., sized for a square or hex nut, is optionally formed on an inside surface 70 of the wedge 58 opposite from the truncated end surface 62, which eases assembly of the mounting bracket apparatus 10.

According to one embodiment of the invention, the part cylindrical relief grooves 52 are optionally formed in the collar 46 within internal bosses 72 formed on the inside wall surface 50. These bosses 72 increase the wall strength and stiffness at the attachment points of the support rods 12, i.e., at the part cylindrical relief grooves 52 of the collar 46. The part cylindrical relief grooves 64 are formed within different reliefs 74 formed in the conical outside wall surface 60 of the wedge 58. These reliefs 74 are complementary to the bosses 72 on the collar inside wall surface 50 and are sized to nest with the bosses 72. The reliefs 74 increase the wall strength and stiffness at the attachment points of the support rods 12, i.e., at the part cylindrical relief grooves 64 of the wedge 58. Furthermore, the bosses 72 and complementary reliefs 74 nested therein operate to maintain relative rotational stability between the collar 46 and wedge 58. In other words, the reliefs 74 nest within the collar's cavity 48 between the bosses 72 and keep the wedge 58 from rotating or twisting when external loads are applied to the rigid mounting platform portion 18, as by loads applied to the portable desk or laptop computer supported by the mounting bracket apparatus 10 of the invention.

Figure 4:
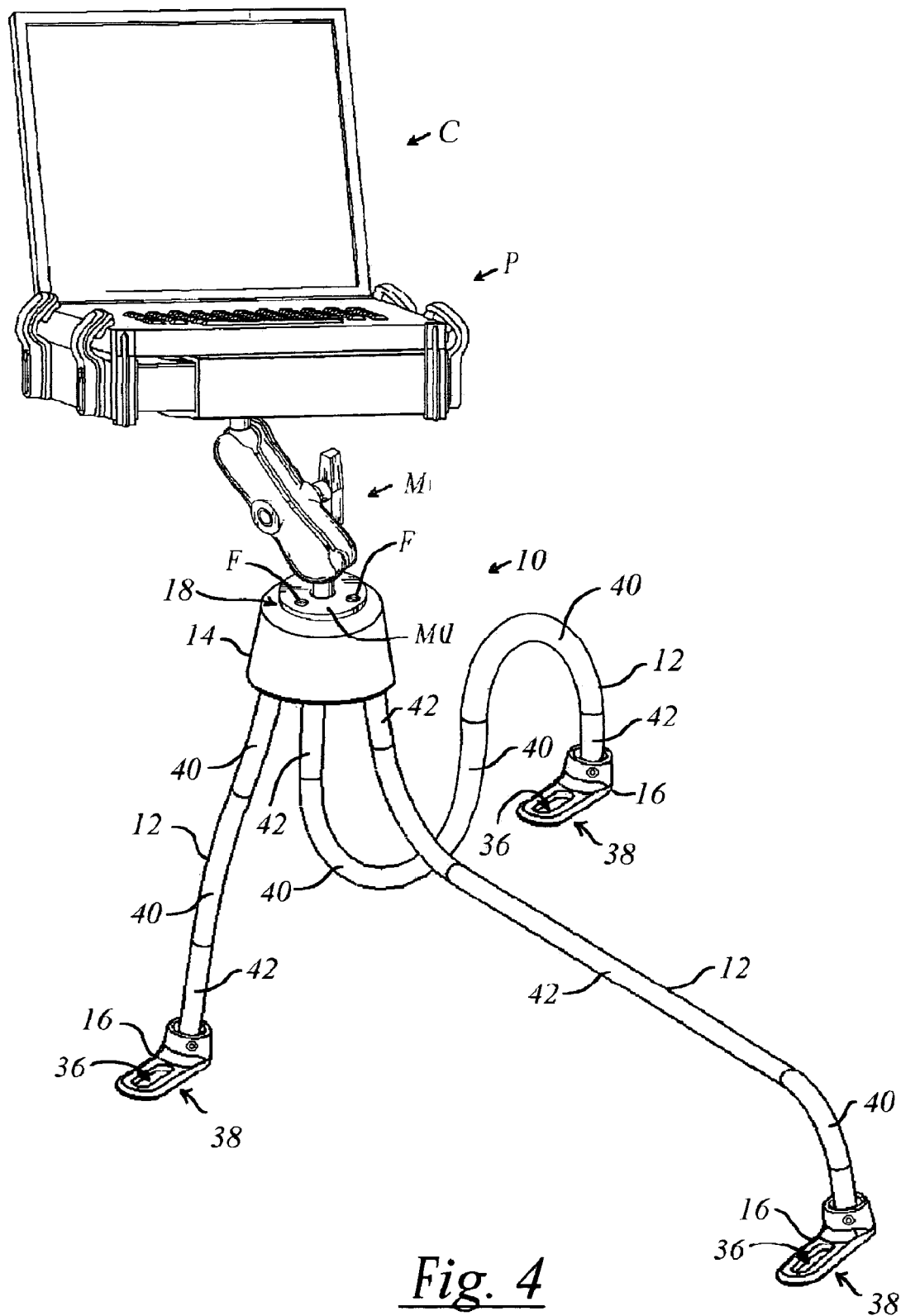
FIG. 4 illustrates the mounting bracket apparatus of the invention having the plurality of bendable metal support rods permanently formed in a tripod stance that configures them substantially in a right angle triangle while supporting a portable desk or laptop computer on a platform.

FIG. 4 illustrates the mounting bracket apparatus 10 of the invention having the plurality of bendable metal support rods 12 permanently formed in a tripod stance that configures them substantially in a right angle triangle with two of the three of the shoes 16 (the leftmost two) oriented with their respective soles 38 oriented substantially horizontally, while a third of the three shoes 16 (shown on the far right) tilted for orienting its sole 38 at an angle to the horizontal. The plurality of bendable metal support rods 12 are thus permanently bent to orient the soles 38 of the leftmost two shoes 16 for attachment to a substantially horizontal mounting surface such as the floorboard of an automobile at the two attachment points along one side of one of the front seats adjacent to the door, while orienting the sole 38 of the rightmost shoe 16 to a non-horizontal mounting surface such as the tilted floorboard of the automobile at the seat attachment point bordering the driveline hump in the middle of the automobile. The mounting bracket apparatus 10 of the invention is thus installed in the automobile at the attachment points of, for example, the driver or passenger front seat, without need of any drilling or cutting of the automobile's structure, by simply removing three of the bolt holding the seat to the floorboard, bending the support rods 12 and optionally rotating the shoes 16 to align the shoe soles 38 with the floorboard and present the slots 36 over the holes in the floorboard for three of the bolt holding the seat, and re-installing the three bolts, thereby securing the shoes 16 and the mounting bracket apparatus 10 to the floorboard along with the seat. This operation presents the rigid mounting platform portion 18 of the combination clamp and rigid mounting platform 14 in a position, for example, ahead of the front passenger seat adjacent to the hump and above the seat bottom cushion and any center console that may be present in the automobile. The mounting platform 18 is thus positioned for presenting a portable desk or laptop computer on a platform (shown) in a position convenient to the automobile's driver. In the example of FIG. 4, the mounting platform 18 is configured for attachment of a universal positioning device M, by example and without limitation, of the type described by Carnevali in U.S. Pat. No. 5,845,885, which is incorporated herein by reference.

Optionally, the base M1 of the universal positioning device M is selected such that the fasteners F that draw the wedge 58 into the funnel-shaped cavity 48 of the collar 46 also secure the positioning device base M1 to the apparatus mounting platform 18, although this is merely a convenience of the collar design and selection of the positioning device base M1. The mounting bracket apparatus 10 of the invention is thus an effective device for presenting a portable desk or laptop computer C when utilized with a platform P, for example, of the type described by Carnevali in U.S. Pat. No. 6,585,212, which is incorporated herein by reference, which is configured with a resiliently compressible ball-shaped coupler of the type described by Carnevali in U.S. Pat. No. 5,845,885 for use with the universal positioning device M. After the mounting bracket apparatus 10 of the invention is secured to the automobile floorboard with the universal positioning device M mounted on the mounting platform 18, the computer C is maneuvered on the universal positioning device M to present the keyboard and display screen for convenient access by the driver or other user. Of course, the metal support legs 12 are bendable into countless other configurations for mounting of the mounting bracket apparatus 10 of the invention in other positions in the automobile, or for mounting in different vehicles such as RVs, all terrain vehicles (ATVs), boats, airplanes, or other vehicles wherein a portable desk, laptop computer or other after-market device would be useful.

Figure 5:
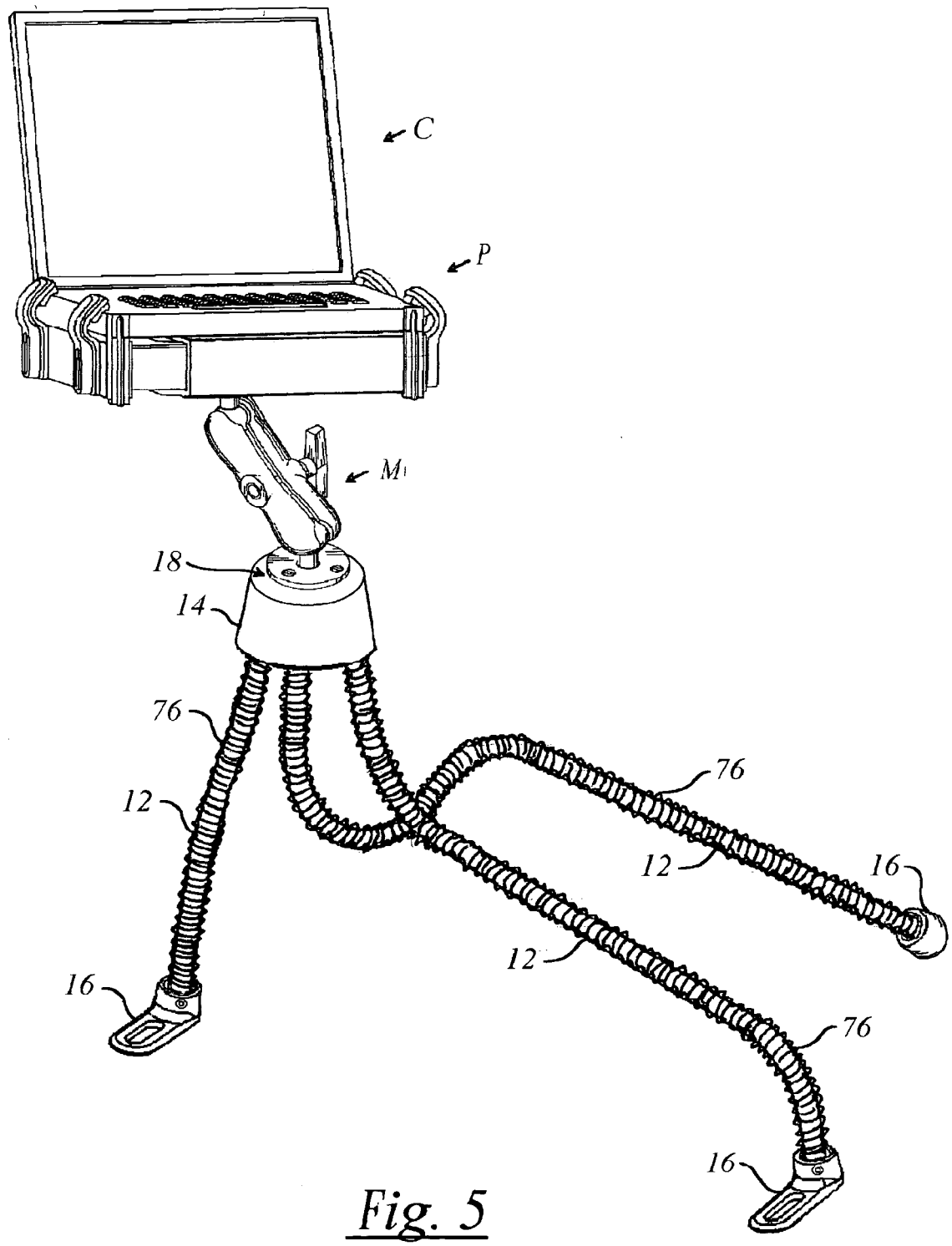
FIG. 5 illustrates the mounting bracket apparatus of the invention with one shoe embodied as a plastic or rubber boot or cap that cannot slip relative to a floor or other external surface, FIG. 5 also illustrates the permanently bendable metal support rods each covered in a flexible plastic sheath sized to slip over the metal support rods.

FIG. 5 illustrates the mounting bracket apparatus 10 of the invention with one of the shoes 16 (shown top right) embodied as another structure configured for resisting slipping relative to the external surface that is different from the shoes 16 shown in the earlier figures and shown here attached to the other two support rods 12 (left and bottom right). By example and without limitation, the shoe mechanism 16 (shown top right) is embodied as a plastic or rubber boot or cap of a type well-known in the art for use, for example, on cane tips, so that the support rod 12 can not slip relative to a floor or other external surface.

FIG. 5 also illustrates the permanently bendable metal support rods 12 each covered in a flexible plastic sheath 76 sized to slip over the outer diameter of the cylindrical metal support rods 12. According to one embodiment of the invention, the flexible plastic sheath 18 is a corrugated plastic tube, as shown in FIG. 5. Alternatively, the flexible plastic sheath 18 is one of an accordion configuration, a smooth-finished plastic tube, a thick foam tube, or another flexible plastic sheath that covers the metal rod 12 while permitting it to be bent to desired shapes without interference. Such alternative sheath materials are well-known to those of skill in the art so as not to require detailed descriptions.

Optionally, the respective apertures 30 formed in the ankle portions 28 of the shoes 16 are sized to accept and optionally to securely retain the elastically flexible plastic sheath 76 covering the metal support rod 12. As illustrated here and shown more clearly in FIG. 2, space is also optionally provided on the inside of the collar 46 between the bosses 72 and the collar rim 78 to tuck in the end of the plastic sheath 76. Optionally, the bosses 72 are sized such that the plastic sheath 76 is pinched between the support rod 12 and the inner wall surface 50 of the collar cavity 48 when the support rod 12 is secured within the pair of complementary part cylindrical relief grooves 52, 64 during assembly.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. A mounting bracket, comprising:
a plurality of support rods each being limited to only a solitary nonextensible member of single-piece construction having a substantially uniformly solid cross-section extended substantially continuously between opposing first and second end portions and being substantially independently permanently bendable in three dimensions along substantially an entire length thereof between the first and second end portions;
means for clamping the first end portions of the plurality of support rods in a fixed arrangement, wherein the means for clamping further comprises means for clamping each of the first end portions in a lengthwise cylindrical cavity formed between a pair of lengthwise part cylindrical relief grooves formed between an external collar and an internal wedge; and means for securing the second end portions of the plurality of support rods relative to an external surface.

2. The mounting bracket of claim 1 wherein the securing means further comprises means for permanently securing the second end portion of a first one of the plurality of support rods relative to an external surface.

3. The mounting bracket of claim 2 wherein the securing means further comprises means for resisting relative slipping of the second end portion of a different second one of the plurality of support rods relative to an external surface.

4. The mounting bracket of claim 1, further comprising a flexible sheath substantially covering each of the plurality of permanently bendable support rods.

5. A vehicle mounting bracket, comprising:
a plurality of unitary support rods each being limited to only a solitary nonextensible metal rod of single-piece construction having a substantially uniformly solid cross-section extended substantially continuously between a first end portion structured for being clamped, and an opposite second end portion structured for being secured relative to an external surface, each of the rods being independently permanently bendable in three orthogonal dimensions along substantially an entire length between the first and second end portions;
a clamp mechanism structured for clamping the first end portions of the plurality of support rods in a fixed arrangement, wherein the clamp mechanism further comprises an external collar and mating wedge structured with a plurality of partial reliefs formed therebetween, each of the partial reliefs being structured for clamping the first end portion of one of the plurality of support rods; and
a shoe mechanism coupled to the second end portions of one of the plurality of support rods, the shoe mechanism being structured for receiving a mechanical fastener for permanently securing the respective second end portion in a fixed position relative to an external surface.

6. The mounting bracket of claim 5 wherein the plurality of unitary support rods further comprises three of the elongated permanently bendable support rods; and
wherein the clamp mechanism is further structured for clamping the first end portions of the plurality of support rods in a fixed substantially triangular arrangement.

7. The mounting bracket of claim 5 wherein each of the elongated permanently bendable support rods further comprises a rod formed of a metal selected from the group of permanently bendable metals consisting of: steel, copper, permanently bendable copper alloys, aluminum, and permanently bendable aluminum alloys.

8. The mounting bracket of claim 7 wherein each of the elongated permanently bendable support rods further comprises a cylindrical rod formed of a permanently bendable aluminum or aluminum alloy having a substantially constant diameter in the range of ¼ inch to 1 inch.

9. The mounting bracket of claim 7 wherein each of the elongated permanently bendable support rods further comprises a uniformly cylindrical rod.

10. The mounting bracket of claim 9 wherein each of the plurality of part cylindrical reliefs further comprises a pair of part cylindrical reliefs with complementary part cylindrical reliefs formed in an internal surface of the collar and an external surface of the wedge.

11. The mounting bracket of claim 10, further comprising an elastically flexible sheath substantially covering each of the elongated permanently bendable support rods between the clamp and shoe mechanisms.

12. The mounting bracket of claim 5 wherein the plurality of unitary support rods further comprises three of the unitary support rods; and
wherein the nonextensible elongated length of a first one of the unitary support rods further comprises a first nonextensible length different from a second nonextensible length of a second one of the unitary support rods.

13. A vehicle mounting bracket, comprising:
a plurality of unitary support rods each being limited to only a solitary nonextensible metal rod of single-piece construction having a substantially uniformly solid cross-section extended substantially continuously between a first end portion structured for being clamped, and an opposite second end portion structured for being secured relative to an external surface, each of the rods being independently permanently bendable in three orthogonal dimensions along substantially an entire length between the first and second end portions;
a clamp mechanism structured for clamping the first end portions of the plurality of support rods in a fixed arrangement, wherein the clamp mechanism further comprises an external collar and mating wedge structured with a plurality of part cylindrical reliefs formed therebetween, each of the part cylindrical reliefs being structured for clamping the first end portion of one of the plurality of support rods; and
a shoe mechanism coupled to the second end portions of one of the plurality of support rods, the shoe mechanism being structured for receiving a mechanical fastener for permanently securing the respective second end portion in a fixed position relative to an external surface.

14. A vehicle mounting bracket, comprising:
a plurality of independently bendable non-telescoping support legs each of single-piece construction having a permanently fixed length and consisting of unitary metal rods having a uniformly continuous solid and unbroken cross-section, each of the unitary metal rods having first and second lengthwise end portions at opposite ends thereof and being permanently bendable in each of three physical dimensions along substantially an entire length between the first and second lengthwise end portions;
a clamp for joining the support rods in a fixed arrangement, the clamp comprising:
an outer female collar forming therein a cavity having at intervals around an inside wall surface thereof a plurality of relief grooves that are sized for nesting of the first lengthwise end portion of one of the support rods, one of the plurality of relief grooves being formed for each of the plurality of support rods,
an inner male wedge having at intervals around an outside wall surface thereof a plurality of relief grooves that are sized for nesting of the lengthwise end portion of one of the support rods, one of the relief grooves being formed in a complementary configuration with a corresponding one of the relief grooves formed on the collar inside wall surface for forming a plurality of pairs of complementary relief grooves with one of the pairs being provided for each of the support rods, each of the plurality of pairs of complementary relief grooves partly enclosing a lengthwise space that is smaller than the respective support rod end portion; and
means for urging the male wedge into the outer female collar with each of the support rod lengthwise end portions securely captured the lengthwise space partly enclosed by one of the pairs of complementary relief grooves.

15. The mounting bracket of claim 14, further comprising a shoe coupled to the second lengthwise end portion of one or more of the support rods, the shoe being structured with means for securing the respective second end portion relative to an external surface.

16. The mounting bracket of claim 15 wherein the shoe further comprises one of:
a shoe structured for being permanently fixed to an external surface with a mechanical fastener, and a shoe structured for resisting slipping relative to an external surface.

17. The mounting bracket of claim 14 wherein the collar further comprises a rigid mounting platform portion formed opposite from cavity having the plurality of relief grooves formed therein.

18. The mounting bracket of claim 17 wherein the plurality of metal support rods further comprises a cylindrical support rod formed of a metal selected from the group of metals consisting of aluminum and permanently bendable aluminum alloys.

19. The mounting bracket of claim 17 wherein the plurality of metal support rods further comprises a substantially cylindrical support rod with the first and second lengthwise end portions at opposite ends thereof being substantially cylindrical lengthwise end portions; and
wherein the plurality of relief grooves formed in one or both of the collar and wedge clamp portions further comprises part cylindrical relief grooves sized to nest the first lengthwise cylindrical support rod end portions therein.

\* \* \* \* \*